(12) United States Patent
Strader et al.

(10) Patent No.: US 8,078,657 B2
(45) Date of Patent: Dec. 13, 2011

(54) MULTI-SOURCE DUAL-PORT LINKED LIST PURGER

(75) Inventors: Todd A. Strader, Hopewell Junction, NY (US); Scot H. Rider, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 1380 days.

(21) Appl. No.: 11/619,378

(22) Filed: Jan. 3, 2007

(65) Prior Publication Data

US 2008/0162871 A1   Jul. 3, 2008

(51) Int. Cl.
*G06F 17/00* (2006.01)

(52) U.S. Cl. ........................................... 708/200

(58) Field of Classification Search .................. None
See application file for complete search history.

(56) References Cited

U.S. PATENT DOCUMENTS

| | | | |
|---|---|---|---|
| 4,047,248 A | 9/1977 | Lyman et al. | |
| 4,768,149 A | 8/1988 | Konopik et al. | |
| 5,644,754 A | 7/1997 | Weber et al. | |
| 5,754,885 A * | 5/1998 | Cheong et al. | 710/26 |
| 5,838,915 A * | 11/1998 | Klausmeier et al. | 709/215 |
| 5,844,825 A * | 12/1998 | Wang et al. | 708/209 |
| 5,995,967 A | 11/1999 | Iacobovici et al. | |
| 6,345,352 B1 | 2/2002 | James et al. | |
| 6,445,680 B1 | 9/2002 | Moyal | |
| 6,611,906 B1 | 8/2003 | McAllister et al. | |
| 6,611,930 B1 * | 8/2003 | Ostrowsky et al. | 714/718 |
| 6,988,177 B2 | 1/2006 | Sokol | |
| 7,334,048 B1 * | 2/2008 | Guan et al. | 709/242 |
| 2002/0012341 A1* | 1/2002 | Battle et al. | 370/378 |
| 2002/0042787 A1* | 4/2002 | Sokol | 707/1 |
| 2006/0031643 A1* | 2/2006 | Figueira | 711/154 |

* cited by examiner

*Primary Examiner* — Keith Vicary (74) *Attorney, Agent, or Firm* — Jon A. Gibbons; Fleit Gibbons Gutman Bongini & Bianco PL (57) ABSTRACT

Disclosed is a circuit for simultaneously searching two ends of a vector. The circuit comprises at least one input for receiving a vector of head pointers. A first input of a memory latch receives the vector of head pointers. An input of a first priority decoder receives the vector of head pointers from the memory latch. The first priority decoder traverses the vector of head pointers from a first end of the vector for identifying one active bit in the vector. An input of a first reverse module also receives the vector of head pointers from the memory latch. An input of second priority decoder receives the vector of head pointers (in reverse order) from the first reverse module. The second priority decoder traverses the vector received from the first reverse module from a first end of the reversed vector for identifying one active bit in the vector.

20 Claims, 6 Drawing Sheets

MULTI-SOURCE DUAL-PORT LINKED LIST PURGER

FIELD OF THE INVENTION

The present invention generally relates to the field of information electronic devices, and more particularly relates to purging linked lists within electronic devices.

BACKGROUND OF THE INVENTION

In a system comprising linked lists implemented in hardware the linked lists are likely purged. Typically a linked list is purged starting with a pointer to the head of the linked list. The pointers of each node in the linked list are then placed in a free block list after they are purged. Currently, a purging mechanism does not exist for efficiently purging a link list when there are multiple points from which the linked list can be purged and only two read ports are available to traverse the linked lists. Two read ports are usually the maximum number of read ports for a register array or RAM. Current linked list purging systems do not provide an efficient purging mechanism for receiving multiple head pointers and then purging the linked lists starting with those head pointers as quickly as possible.

Therefore a need exists to overcome the problems with the prior art as discussed above.

SUMMARY OF THE INVENTION

Briefly, in accordance with the present invention, disclosed are a circuit and networking device for simultaneously searching two ends of a vector. The circuit comprises at least one input for receiving a vector of head pointers. A memory latch includes two inputs and an output, wherein a first input receives the vector of head pointers. A first priority decoder includes an input and an output, wherein the input of the first priority decoder receives the vector of head pointers from the memory latch. The first priority decoder traverses the vector of head pointers from a first end of the vector for identifying one active bit in the vector. A first reverse module includes an input and an output, wherein the input also receives the vector of head pointers from the memory latch. A second priority decoder includes an input and an output. The input of second priority decoder receives a vector of head pointers from the first reverse module. The vector of head pointers received from the first reverse module are the vector of head pointers received at the at least one input in reverse order. The second priority decoder traverses the vector of head pointers received from the first reverse module from a first end of the reversed vector of head pointers for identifying one active bit in the vector.

In another embodiment, a networking device is disclosed. The networking device includes a memory and a processor that is communicatively coupled to the memory. The networking device also includes a circuit for simultaneously searching two ends of a vector. The circuit being communicatively coupled to the memory and the processor. The circuit includes at least one input for receiving a vector of head pointers. A memory latch includes two inputs and an output, wherein a first input receives the vector of head pointers. A first priority decoder includes an input and an output, wherein the input of the first priority decoder receives the vector of head pointers from the memory latch. The first priority decoder traverses the vector of head pointers from a first end of the vector for identifying one active bit in the vector. A first reverse module includes an input and an output, wherein the input also receives the vector of head pointers from the memory latch. A second priority decoder includes an input and an output. The input of second priority decoder receives a vector of head pointers from the first reverse module. The vector of head pointers received from the first reverse module are the vector of head pointers received at the at least one input in reverse order. The second priority decoder traverses the vector of head pointers received from the first reverse module from a first end of the reversed vector of head pointers for identifying one active bit in the vector.

One advantage of the present invention is that a vector traversing circuit is provided that can traverse a vector simultaneously from both ends to identify two active bits. In the context of linked lists, the active bits can be pointers into different linked lists that are used by a linked list walker to simultaneously traverse two different linked lists. The vector traversing process reduces the time to traverse a vector by at most a multiple of 2.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, source code, object code, a shared library/dynamic load library and/or other sequence of instructions designed for execution on a computer system.

Vector Traversing Circuit

Figure 1:
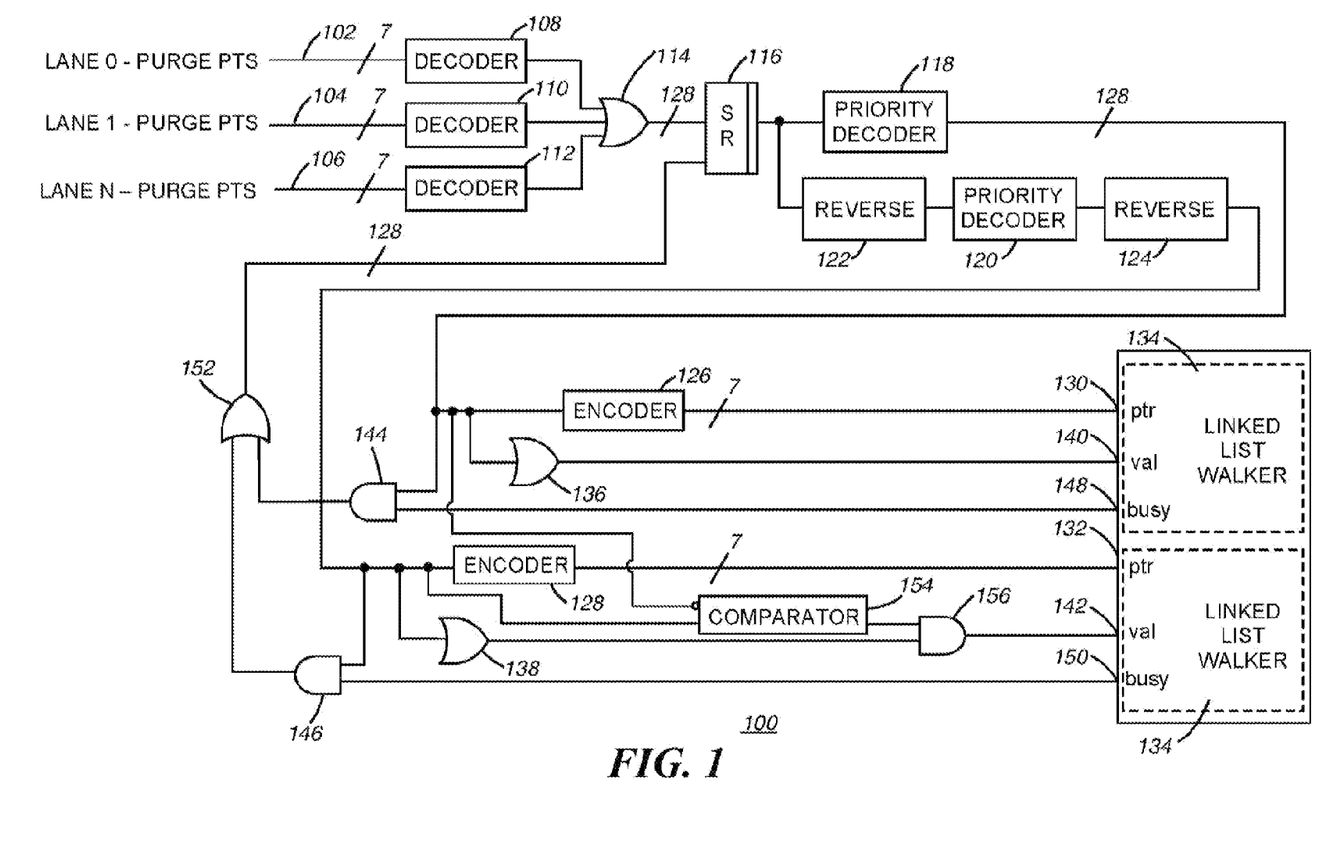
FIG. 1 is a schematic of a vector traversing circuit according to an embodiment of the present invention.
Figure 2:
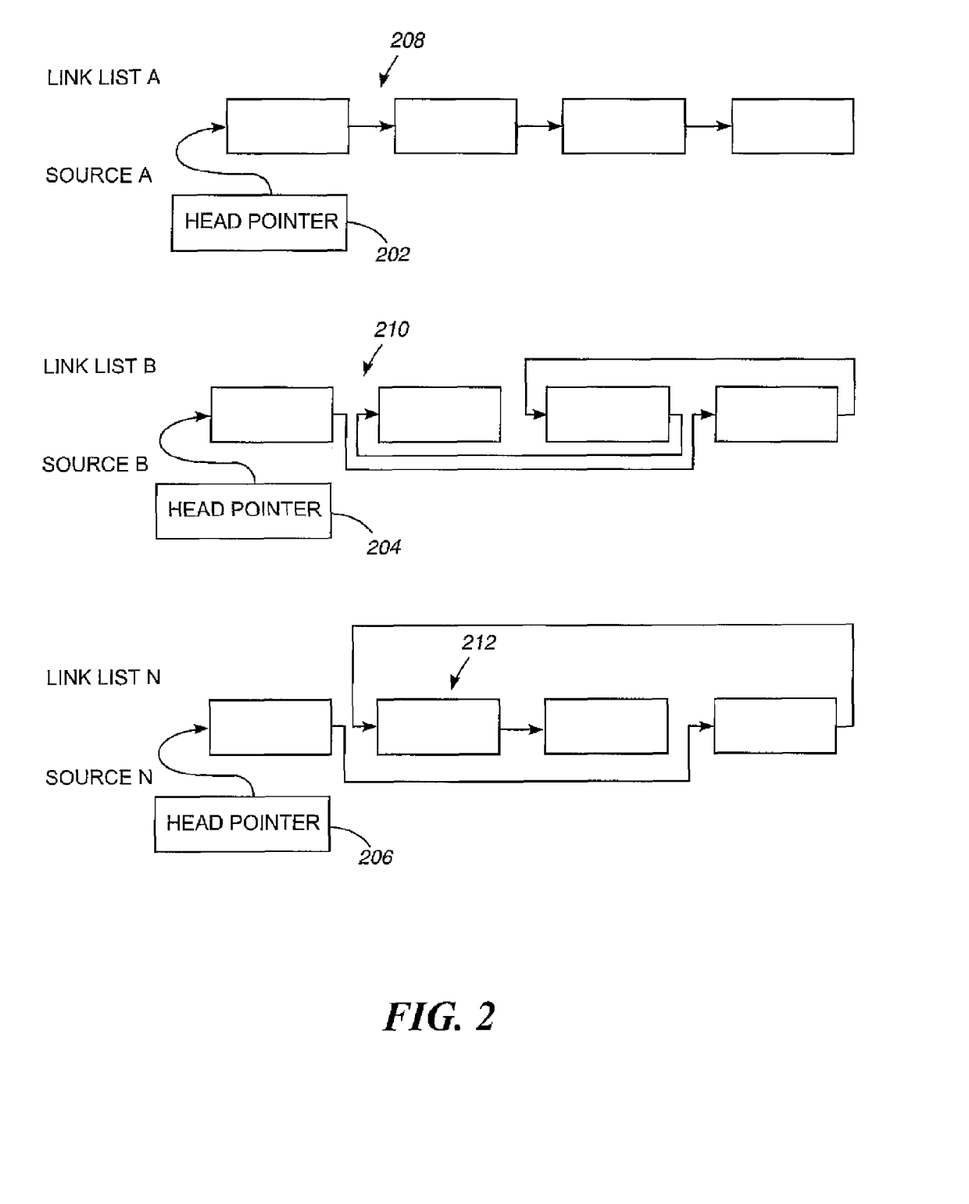
FIG. 2 is a block diagram showing head pointers point to different linked lists according to an embodiment of the present invention.

FIG. 1 shows a schematic of a vector traversing circuit 100. In one embodiment, the vector traversing circuit 100 resides within a networking device. However, this is only one example and is not limiting. The vector traversing circuit 100 concurrently identifies one or more active bits in a vector utilizing a priority decoder and a reverse priority decoder. In other words, the vector traversing circuit 100 simultaneously traverses each end of a vector to identify one or more active bits in a single clock cycle. One advantage of the present invention is that the time to identify two active bits in a vector of bits is decreased by at most a multiple of 2. It should be noted that the following discussing uses the vector traversing circuit 100 within the context of linked lists, which is a logical organization of data stored in memory. A linked list is a well-known fundamental data structure in computer programming. The term link list is derived from a link or pointer to another data of the same type in this self-referential data type. However, the present invention is not limited to linked lists A vector, in one embodiment, is a one dimensional array. FIG. 1 shows one or more sources coupled to a respective decoder. For example, source A (e.g. lane 0 purge pointer) 102 is coupled to decoder A 108, source B (e.g. lane 1 purge pointer) 104 is coupled to decoder B 110, and source N (e.g. lane N-1 purge pointer) 106 is coupled to decoder N 112. Each source 102, 104, 106 provides a head pointer (eg., a 7-bit value) into a link list that the source wants to have packets purged in. In other words, a head pointer points to a head of a linked list. The circuit 100 can receive data from one or more of the sources 102, 104, 106 at the same time. FIG. 2 shows a block diagram illustrating head points from a source. As can be seen from FIG. 2 a head pointer 202 from source A 102 points to the head of a first linked list 208. A head pointer 204 from source B 104 points to the head of a second linked list 210. Similarly, a head pointer 206 from source N 106 points to the head of a third linked list 212.

Referring back to FIG. 1, each source 102, 104, 106 passes its data such as the head pointers into a respective decoder 108, 110, 112. The output of each decoder 108, 110, 112 acts as an input to an OR gate 114. The OR gate takes the output of each decoder 108, 110, 112 and OR's them together. The output of the OR gate 114 is used to set a vector of latches 116 that stores head pointers to linked lists that need to be purged. In one embodiment, a 128-bit vector is outputted by the set-reset latch 116 that can include more than one value. It is important to note that for simplicity in FIG. 1, only one set-reset latch 116 representing 1 bit of the 128 bits is shown. The other 127 bits would formed in parallel to the circuit in FIG. 1. The vector of latches is passed in parallel through two identical priority decoders 118, 120, where one has the signals reversed both on the input 122 and the output 124 so that the priority mechanism of the second priority decoder 120 is opposite that of the first.

Figure 4:
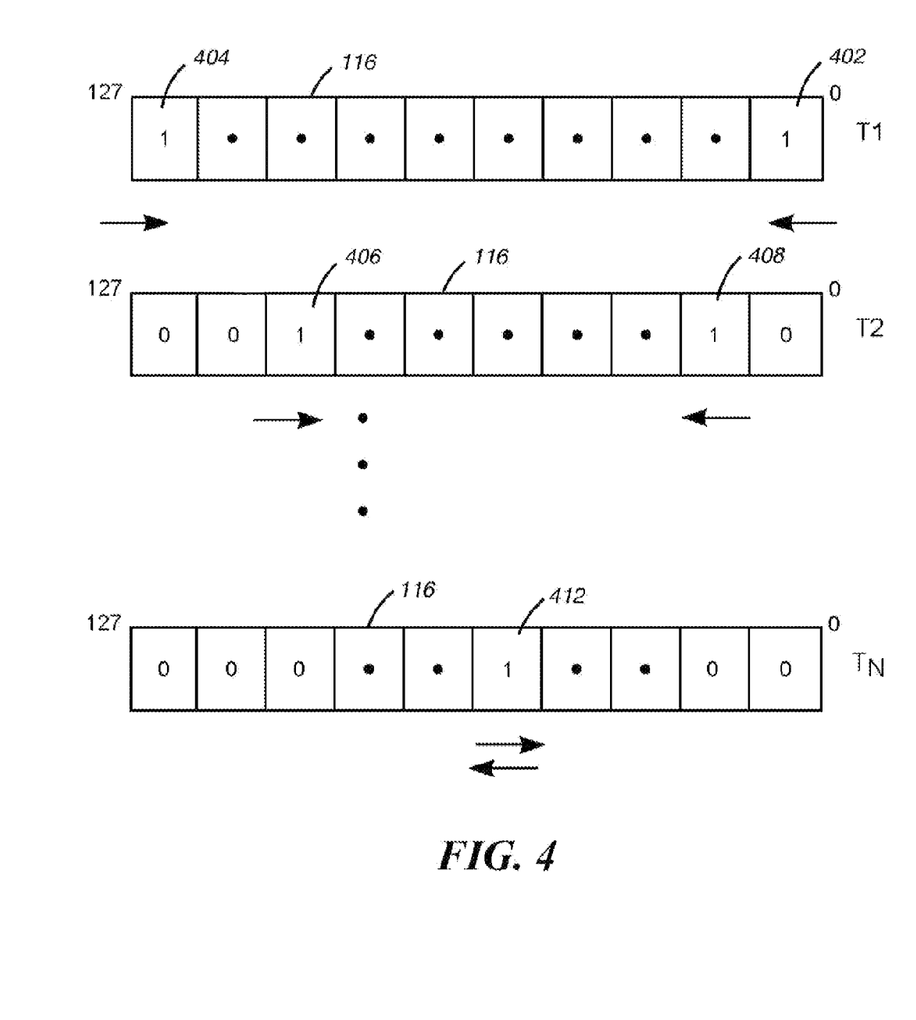
FIG. 4 is a timing diagram illustrating a process of traversing a vector from both ends in one clock cycle according to an embodiment of the present invention.

For example, FIG. 4 shows how a vector of latches 116, which represents decoded pointers to linked lists that need to be purged, can be traversed by the present invention. At a first clock cycle $T_1$, the first priority decoder 118 traverses the MSB 402 of the vector 116. Simultaneously, the second priority decoder 120 traverses the LSB 404 of the vector 116. Having discovered these two active bits 402,404, they are reset from latch 116 by logic to be described subsequently resulting in the state T2. In this state now 408 and 406 will be reset resulting in state T3. In state T3 both priority decoders indicate 412 and here this is the only valid output.

Note that if both priority decoders 118, 120 yield different results as determined by a comparator 154, both results are considered valid. If both priority decoders 118, 120 yield the same results, only one result is valid (and is gated off by 156), and if both results from the priority decoders 118, 120 fail to yield an active bit, then neither result is valid. Only valid bits can be encoded back into pointers that can be used by the linked list walker as pointers into linked lists.

Referring back to FIG. 1, the results (values of the bits currently traversed in a given clock cycle) of the priority decoders 118, 120 are each passed to an encoder 126, 128, respectively. The encoders 126, 128 encode the results of priority decoders 118, 120 to be used as pointers in the linked list structure. The output of the encoders 126, 128 is received at a pointer port 130, 132 of a linked list walker 134. The output of the priority decoders 118, 120 is also received as inputs at separate OR gates 136, 138, respectively. The OR gates 136, 138 OR the outputs of the priority decoders 118, 120 and sends this output to a respective "valid" port 140, 142 at the linked list walker 134. The "valid" ports 140, 142 check the validity of the pointers.

Figure 3:
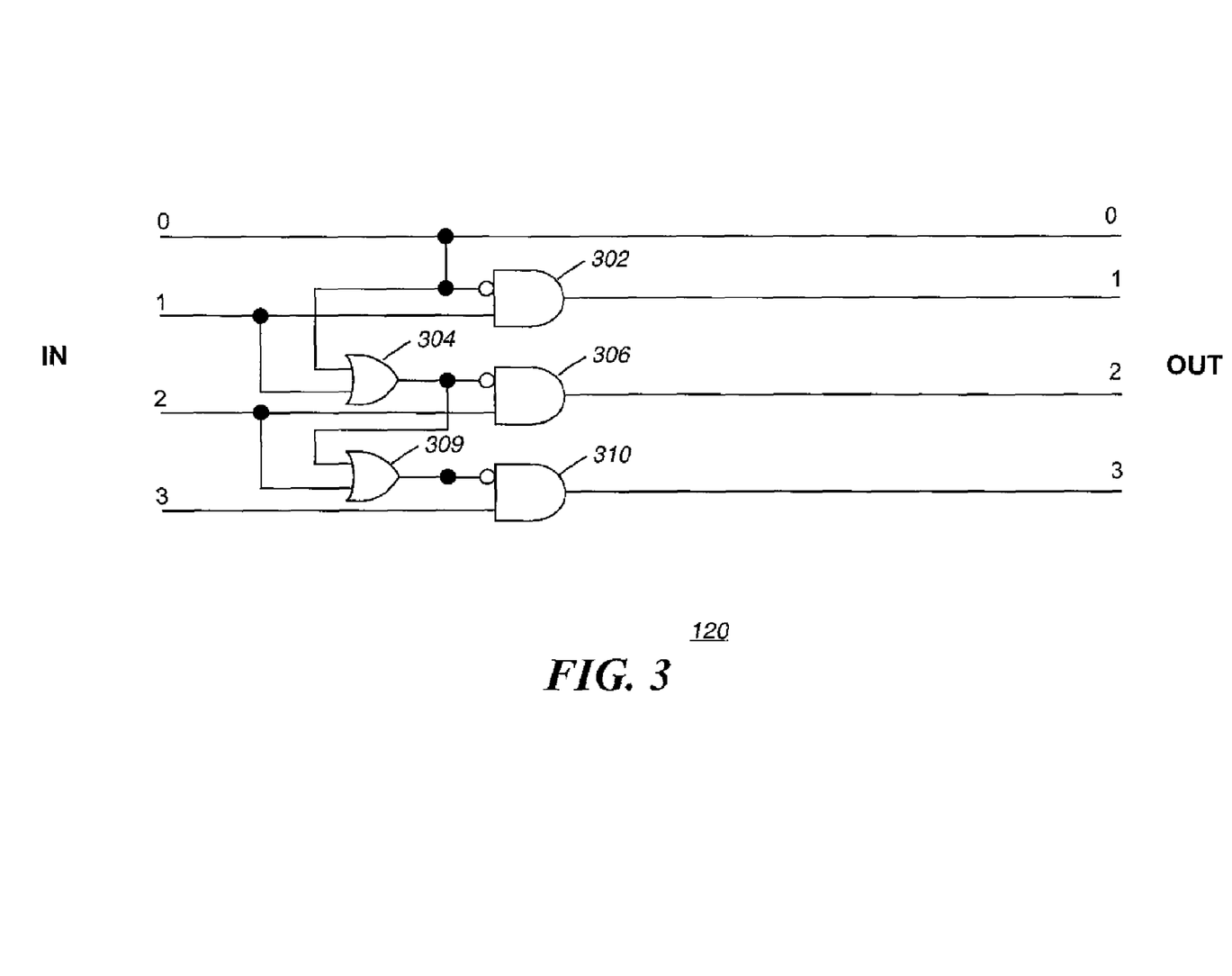
FIG. 3 is a schematic of a priority decoder according to one embodiment of the present invention.

FIG. 3 shows a schematic of a priority decoder such as the first priority decoder 120. In the example, of FIG. 3, the priority decoder 120 is a 4-bit priority decoder. A first AND gate 302 receives a first bit as a first input which is inverted and a second bit as a second input. The output of the first AND gate 302 is the inverted first bit ANDed together with the second bit.

A first OR gate 304 also received the first bit and the second bit and ORs these bits together to provide a first input (which is inverted) to a second AND gate 306. A third bit acts as the second input to the second AND gate 306. The output of the second AND gate 306 is the inverted input from the first OR gate 304 and the third bit ANDed together. A second OR gate 309 receives the output of the first OR gate 304 as its first input. The third bit is the second input to the second OR gate 309. The second OR gate 309 ORs its two inputs together to provide a first input (which is inverted) to a third AND gate 310. A fourth bit is the second input to the third AND gate 310. The two inputs of the third AND gate 310 are ANDed together resulting in an output.

The linked list walker 134 is a circuit that uses pointers received from the priority decoders 118, 120 to simultaneously traverse two linked lists at a time to purge elements of the linked lists. For example, the pointer ports 130, 132 of the linked list walker can each receive pointer where each pointer points to two different linked lists. The linked list walker 134 uses these pointers to identify the beginning of each linked list to begin purging elements of each linked list. Once an element has been purged, its corresponding memory is added to a free memory block pool.

As can be seen, the present invention is advantageous in that a vector can be traversed simultaneously from both ends to identify two active bits. In the context of linked lists, the active bits can be pointers into different linked lists that are used by a linked list walker to simultaneously traverse two different linked lists. The vector traversing process reduces the time to traverse a vector by at most a multiple of 2.

It should be noted that the circuit 100 can receive source data faster than a linked list can be traversed by the linked list walker 134. For example, in some instances it can take many clock cycles to traverse a link list. Therefore, a gating mechanism is provided in the circuit 100. For example, FIG. 1 shows that a first AND gate 144 also receives the output from the first priority decoder 118 and also receives data from first busy port 148 on the linked list walker 134. A second AND gate also receives the output from the second priority decoder 120 and receives data from a second busy port 150 at the linked list walker 134.

The output of each AND gate 144, 146 is an input for a third OR gate 152. The output of the third OR gate 152 is an input for the reset port at the set-reset latch 116. This ensures that the set-reset latch holds the priority decoders at a current bit until the linked list walker 134 indicates that it is ready to receive a new value. For example, after the linked list walker 134 finishes traversing at least one linked list, it indicates that it has taken the value presented to it and clears the corresponding bit in the vector of latches.

Figure 5:
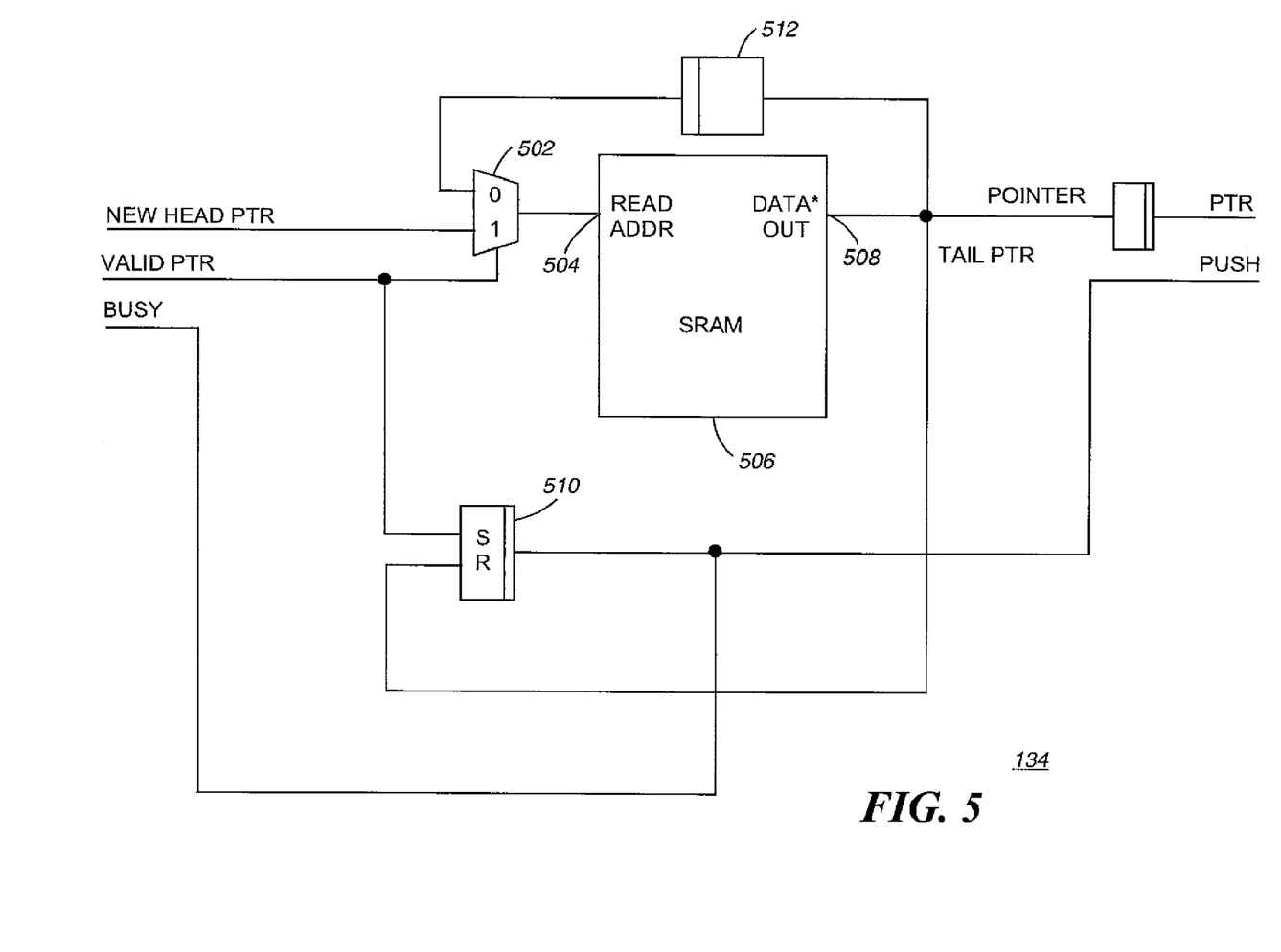
FIG. 5 is a schematic of a linked list purging circuit according to an embodiment of the present invention.

FIG. 5 shows the linked list walker 134 in greater detail. FIG. 5 shows a mux 502 connected to a read port 504 of a memory 506 such as static random access memory module. The mux 502 takes as input a new head pointer from the priority decoders 118, 120, a valid pointer, and the output from the data out port 508. In one embodiment, the data from the data out port 508 is a next pointer and a tail bit.

FIG. 5 also shows a set-reset latch 510 which takes as an input the valid pointer signal and the tail signal from the data out port 508. The output of the set-reset latch 510 is used by the AND gates 144, 146 discussed above as a busy signal to indicate when the linked list walker 134 can process another pointer from the decoders 118, 120. The output of the set-reset latch also pushes memory that has been freed from the linked list into a free block memory pool.

Exemplary Information Processing System

Figure 6:
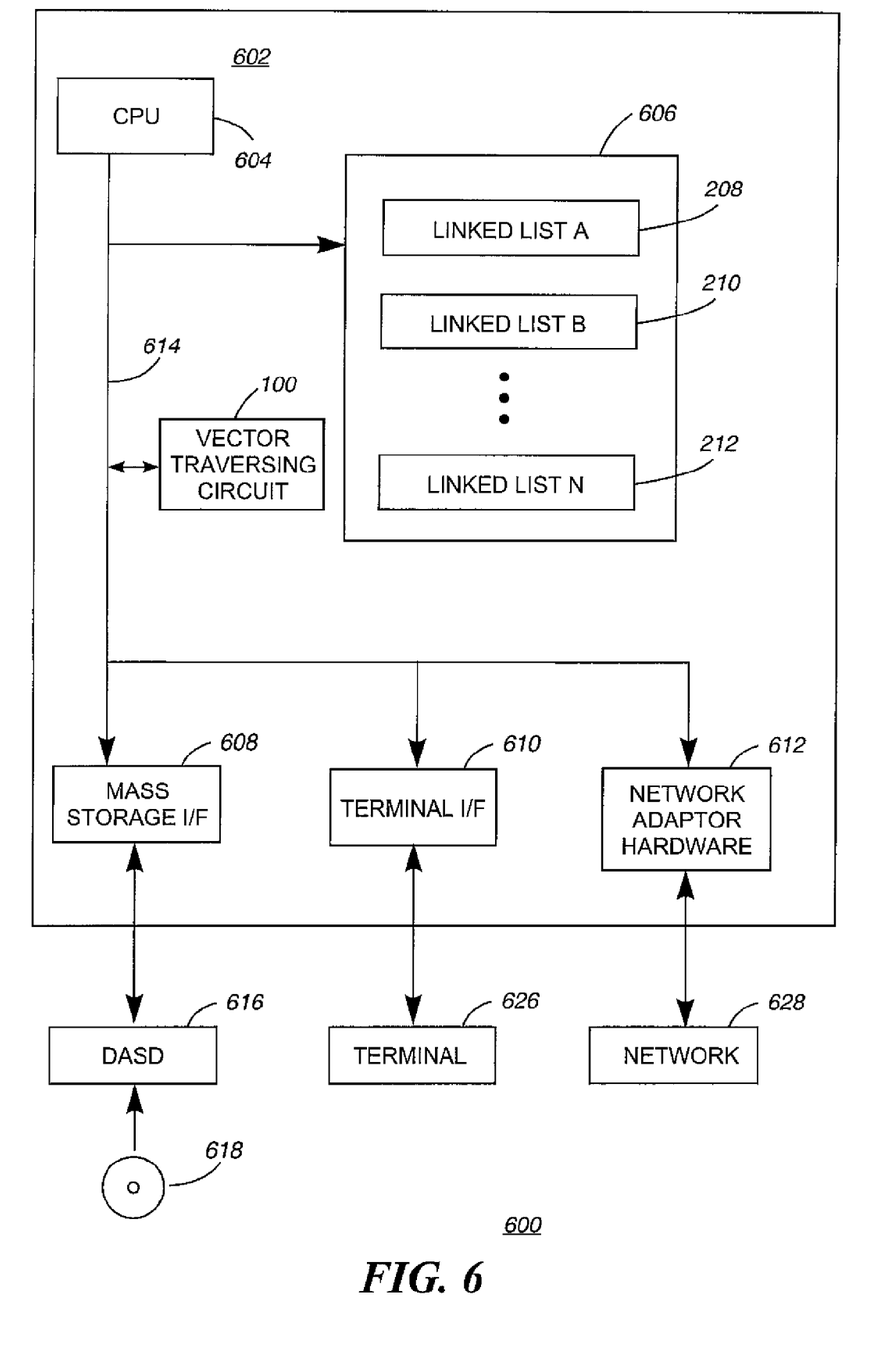
FIG. 6 is a block diagram of an information processing system according to an embodiment of the present invention.

FIG. 6 is a block diagram illustrating a detailed view of an information processing system 600. The information processing system 600, in one embodiment, is based upon a suitably configured processing system adapted to implement the exemplary embodiment of the present invention. Any suitably configured processing system is similarly able to be used as the information processing system 600 by embodiments of the present invention, for example, a personal computer, workstation, or the like.

The information processing system 600 includes a computer 602. The computer 602 has a processor 604 that is communicatively connected to a main memory 606 (e.g., volatile memory), non-volatile storage interface 608, a terminal interface 610, a network adapter hardware 612, and the vector traversing circuit 100. A system bus 614 interconnects these system components. The non-volatile storage interface 608 is used to connect mass storage devices, such as data storage device 616 to the information processing system 600. One specific type of data storage device is a computer readable medium such as a CD drive, which may be used to store data to and read data from a CD or DVD 618 or floppy diskette (not shown). Another type of data storage device is a data storage device configured to support, for example, NTFS type file system operations.

The main memory 606, in one embodiment, includes one or more linked lists 208 210, 212. The linked lists are traversed and purged by the linked list walker 134 as discussed above. Although shown as residing in the memory 606, these components can be implemented in hardware within the information processing system 600. In one embodiment, the information processing system 600 utilizes conventional virtual addressing mechanisms to allow programs to behave as if they have access to a large, single storage entity, referred to herein as a computer system memory, instead of access to multiple, smaller storage entities such as the main memory 606 and data storage device 616. Note that the term "computer system memory" is used herein to generically refer to the entire virtual memory of the information processing system 600.

Although only one CPU 604 is illustrated for computer 602, computer systems with multiple CPUs can be used equally effectively. Embodiments of the present invention further incorporate interfaces that each includes separate, fully programmed microprocessors that are used to off-load processing from the CPU 604. Terminal interface 610 is used to directly connect one or more terminals 626 to computer 602 to provide a user interface to the computer 602. These terminals 626, which are able to be non-intelligent or fully programmable workstations, are used to allow system administrators and users to communicate with the thin client. The terminal 626 is also able to consist of user interface and peripheral devices that are connected to computer 602 and controlled by terminal interface hardware included in the terminal I/F 610 that includes video adapters and interfaces for keyboards, pointing devices, and the like.

An operating system, according to an embodiment, can be included in the main memory 606 and is a suitable multitasking operating system such as the Linux, UNIX, Windows XP, and Windows Server operating system. Embodiments of the present invention are able to use any other suitable operating system, or kernel, or other suitable control software. Some embodiments of the present invention utilize architectures, such as an object oriented framework mechanism, that allows instructions of the components of operating system (not shown) to be executed on any processor located within the client. The network adapter hardware 612 is used to provide an interface to a network 628. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 618, CD ROM, or other form of recordable media, or via any type of electronic transmission mechanism.

Non-Limiting Examples

The circuit as described above is part of the design for an integrated circuit chip. The chip design is created in a programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The method as described above is used in the fabrication of integrated circuit chips.

The resulting integrated circuit chips can be distributed by the fabricator in raw wafer form (that is, as a single wafer that has multiple unpackaged chips), as a bare chip, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard, or other input device, and a central processor.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The invention is not limited to any particular computer program or logic or language, or instruction but may be practiced with any such suitable program, logic or language, or instructions as would be known to one of ordinary skill in the art.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A circuit for simultaneously searching two ends of a vector, the circuit comprising:
   at least one input for receiving a vector of head pointers;
   a memory latch comprising two inputs and an output, wherein a first input receives the vector of head pointers;
   a first priority decoder including an input and an output, wherein the input of the first priority decoder receives the vector of head pointers from the memory latch, wherein the first priority decoder traverses the vector of head pointers from a first end of the vector for identifying one active bit in the vector;
   a first reverse module including an input and an output, wherein the input also receives the vector of head pointers from the memory latch;
   a second priority decoder including an input and an output, wherein the input of second priority decoder receives a vector of head pointers from the first reverse module, wherein the vector of head pointers received from the first reverse module are the vector of head pointers received at the at least one input in reverse order, and wherein the second priority decoder traverses the vector of head pointers received from the first reverse module from a first end of the reversed vector of head pointers for identifying one active bit in the vector; and
   a gating mechanism comprising a first AND gate, a second AND gate, and an OR gate, wherein a first input of the first AND gate is coupled to the output of the first priority decoder, and wherein a second input of the first AND gate is coupled to a first busy port of a linked list purging circuit,
   wherein a first input of the second AND gate is coupled to the output of a second reverse module, and wherein a second input of the second AND gate is coupled to a second busy port of the linked list purging circuit, and
   wherein a first input of the OR gate is coupled to an output of the first AND gate, and wherein a second input of the OR gate is coupled to an output of the second AND gate, wherein an output of the OR gate is coupled to a reset port of the memory latch.

2. The circuit of claim 1, wherein the first priority decoder and the second priority decoder each traverse the vector of head pointers in its entirety in one clock cycle.

3. The circuit of claim 1, wherein the first priority decoder includes an output coupled to an input of a first encoder, wherein the first priority decoder outputs an identified active bit to the first encoder.

4. The circuit of claim 3, wherein the first encoder generates a pointer based on the identified active bit received from the first priority decoder, wherein the pointer points to a starting point of a first linked list, and wherein the pointer is passed to a first input of the linked list purging circuit.

5. The circuit of claim 4, wherein the output of the second priority decoder is coupled to the second reverse module, wherein the second reverse module outputs an identified active bit received from the second priority decoder to a second encoder.

6. The circuit of claim 5, wherein the second encoder generates a pointer based on the identified active bit received from the second reverse module, wherein the pointer points to a starting point of a second linked list, and wherein the pointer is passed to a second input of a linked list purging circuit.

7. The circuit of claim 1, wherein the circuit further comprises a first OR gate for ORing two or more vectors of head pointers together, wherein the first OR gate includes an output coupled to the memory latch.

8. The circuit of claim 7, wherein the output of the first OR gate is used to clear a bit indicating a valid pointer that is no longer valid.

9. The circuit of claim 1, wherein a second input of the memory latch receives a signal from a linked list purging circuit indicating a status of one of "busy" and "ready".

10. The circuit of claim 1, wherein the output of the first priority decoder and the output of the second priority decoder are detected to be similar resulting in the output of the second priority decoder to be invalidated, and wherein in response to the output of the first priority decoder and the output of the second priority decoder being detected as not active, no action is taken upon the output of the first priority decoder and the output of the second priority decoder.

11. A networking device, the networking device comprising:
   a memory;
   a processor communicatively coupled to the memory; and
   a circuit communicatively coupled to the memory and the processor for simultaneously searching two ends of a vector, the circuit comprising:
      at least one input for receiving a vector of head pointers;
      a memory latch comprising two inputs and an output, wherein a first input receives the vector of head pointers;

a first priority decoder including an input and an output, wherein the input of the first priority decoder receives the vector of head pointers from the memory latch, wherein the first priority decoder traverses the vector of head pointers from a first end of the vector for identifying one active bit in the vector;

a first reverse module including an input and an output, wherein the input also receives the vector of head pointers from the memory latch;

a second priority decoder including an input and an output, wherein the input of second priority decoder receives a vector of head pointers from the first reverse module, wherein the vector of head pointers received from the first reverse module are the vector of head pointers received at the at least one input in reverse order, and wherein the second priority decoder traverses the vector of head pointers received from the first reverse module from a first end of the reversed vector of head pointers for identifying one active bit in the vector; and a gating mechanism comprising a first AND gate, a second AND gate, and an OR gate, wherein a first input of the first AND gate is coupled to the output of the first priority decoder, and wherein a second input of the first AND gate is coupled to a first busy port of a linked list purging circuit, wherein a first input of the second AND gate is coupled to the output of a second reverse module, and wherein a second input of the second AND gate is coupled to a second busy port of the linked list purging circuit, and wherein a first input of the OR gate is coupled to an output of the first AND gate, and wherein a second input of the OR gate is coupled to an output of the second AND gate, wherein an output of the OR gate is coupled to a reset port of the memory latch.

12. The networking device of claim 11, wherein the first priority decoder and the second priority decoder each traverse the vector of head pointers in its entirety in one clock cycle.

13. The networking device of claim 11, wherein the first priority decoder includes an output coupled to an input of a first encoder, wherein the first priority decoder outputs an identified active bit to the first encoder.

14. The networking device of claim 13, wherein the first encoder generates a pointer based on the identified active bit received from the first priority decoder, wherein the pointer points to a starting point of a first linked list, and wherein the pointer is passed to a first input of the linked list purging circuit.

15. The networking device of claim 11, wherein the output of the second priority decoder is coupled to the second reverse module, wherein the second reverse module outputs an identified active bit received from the second priority decoder to a second encoder.

16. The networking device of claim 15, wherein the second encoder generates a pointer based on the identified active bit received from the second reverse module, wherein the pointer points to a starting point of a second linked list, and wherein the pointer is passed to a second input of a linked list purging circuit.

17. The networking device of claim 11, wherein the circuit further comprises a first OR gate for ORing two or more vectors of head pointers together, wherein the first OR gate includes an output coupled to the memory latch.

18. The networking device of claim 17, wherein the output of the first OR gate is used to clear a bit indicating a valid pointer that is no longer valid.

19. The networking device of claim 11, wherein a second input of the memory latch receives a signal from a linked list purging circuit indicating a status of one of "busy" and "ready".

20. The networking device of claim 11, wherein the output of the first priority decoder and the output of the second priority decoder are detected to be similar resulting in the output of the second priority decoder to be invalidated, and wherein in response to the output of the first priority decoder and the output of the second priority decoder being detected as not active, no action is taken upon the output of the first priority decoder and the output of the second priority decoder.

* * * * *